United States Patent
Yamamoto et al.

(10) Patent No.: US 9,088,165 B2
(45) Date of Patent: Jul. 21, 2015

(54) CONTACTLESS METHOD OF SUPPLYING POWER

(71) Applicant: SANYO ELECTRICS CO., LTD., Osaka (JP)

(72) Inventors: Hiroyoshi Yamamoto, Sumoto (JP); Ryoji Watanabe, Minamiawaji (JP); Mikitaka Tamai, Sumoto (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 340 days.

(21) Appl. No.: 13/867,371

(22) Filed: Apr. 22, 2013

(65) Prior Publication Data

US 2013/0285620 A1    Oct. 31, 2013

(30) Foreign Application Priority Data

Apr. 25, 2012   (JP) ................................. 2012-100409

(51) Int. Cl.
*H02J 7/00*    (2006.01)
*H02J 7/02*    (2006.01)

(52) U.S. Cl.
CPC ............... *H02J 7/0029* (2013.01); *H02J 7/025* (2013.01)

(58) Field of Classification Search
CPC ....................................................... H02J 7/025
USPC ....................................................... 320/108
See application file for complete search history.

(56) References Cited

U.S. PATENT DOCUMENTS

| | | | | |
|---|---|---|---|---|
| 7,233,137 B2 * | 6/2007 | Nakamura et al. | ............ | 323/355 |
| 2008/0303479 A1 * | 12/2008 | Park et al. | ...................... | 320/108 |
| 2010/0187912 A1 * | 7/2010 | Kitamura et al. | ............. | 307/104 |
| 2011/0140538 A1 * | 6/2011 | Jung et al. | ..................... | 307/104 |
| 2011/0270462 A1 * | 11/2011 | Amano et al. | ................ | 700/297 |
| 2012/0043931 A1 * | 2/2012 | Terao et al. | ................... | 320/108 |

FOREIGN PATENT DOCUMENTS

JP           2008-17562          1/2008

* cited by examiner

*Primary Examiner* — Drew A Dunn
*Assistant Examiner* — Tessema Kebede
(74) *Attorney, Agent, or Firm* — Wenderoth, Lind & Ponack, L.L.P.

(57) ABSTRACT

The contactless method of supplying power magnetically couples a portable device receiving coil with a power supply stand transmitting coil and transmits power by magnetic induction. The portable device sends power adjustment signals to the power supply stand, and the stand adjusts transmitting coil output based on the power adjustment signals. The portable device compares the power received from the stand to the required power, sends an increase-power-request signal if the received power is below the required power, and sends a decrease-power-request signal if the received power is above the required power. Power adjustment signals include increase-power-request weighting values that increase with the size of the request to increase power and/or rate-of-change weighting values that increase with the amount of change in the requested power. Weighting values output with a given period are added and a foreign object is judged to be present when the sum attains a set value.

13 Claims, 7 Drawing Sheets

CONTACTLESS METHOD OF SUPPLYING POWER

BACKGROUND OF THE INVENTION

1. Field of the Invention

The present invention relates to a contactless (wireless) method of supplying power that disposes a transmitting coil and a receiving coil in close proximity to magnetically couple the coils to supply power from the transmitting coil to the receiving coil by magnetic induction, and in particular to a contactless method of supplying power that detects foreign objects on the power supply stand (pad, platform, stage, cradle).

2. Description of the Related Art

A contactless method of supplying power that places a portable device housing a receiving coil on a power supply stand housing a transmitting coil and transmits power from the transmitting coil to the receiving coil has been developed. (Refer to Japanese Laid-Open Patent Publication 2008-17562.)

In the contactless method of supplying power of the related disclosure, a charging pad serves as the power supply stand, a battery powered device serves as the portable device, and power is transmitted from the charging pad to the battery powered device to charge a battery internal to the battery powered device. For contactless charging, the portable device receiving coil is put in close proximity with the power supply stand transmitting coil to supply power from the transmitting coil to the receiving coil. The internal battery is charged by power induced in the receiving coil. In this method of supplying power, power can be transmitted to the portable device in a contactless manner and there is no need to connect the portable device to the power supply stand via connectors.

This method of supplying power has the drawback that if a metal foreign object such as a paper clip is on the power supply stand when it is supplying power, current will be induced in the foreign object and heat will be generated due to Joule-heating. Further, since wasted power is consumed by current induced in the foreign object, this method also has the drawback that power cannot be efficiently supplied from the power supply stand to the portable device. To eliminate these drawbacks, the charging pad cited in JP 2008-17562 has many temperature sensors disposed in an x-y array on its upper surface to detect foreign objects. The temperature sensors detect heat generated by foreign objects on the charging pad.

If alternating current (AC) power is supplied to the transmitting coil of this charging pad with a metal foreign object on its upper surface, heat will be generated by current induced in the foreign object and that heat will be detected by a temperature sensor disposed nearby.

Since the charging pad described above requires temperature sensors to detect foreign objects and decision circuitry to judge the presence of foreign objects from temperature detected by the temperature sensors, it has the drawbacks of complex circuit structure for foreign object detection and high manufacturing cost. It also has drawbacks such as the inability to stably and reliably detect a foreign object positioned at a distance from the nearest temperature sensor, or delayed detection resulting in detrimental conditions such as excessive heat generated by the foreign object. Further, since this charging pad judges the presence of a foreign object by detecting its heat generation with temperature sensors, the foreign object can be heated to an excessive temperature at the time of detection, and this has the drawback that the foreign object cannot be detected safely.

Since a contactless method of supplying power transmits power from a transmitting coil to a receiving coil by magnetic induction, power transmission efficiency can drop if the relative position of the receiving coil shifts with respect to the transmitting coil. For example, this situation can result from position shift in the portable device due to a disturbance such as vibration during power transmission from the power supply stand to the portable device. If power transmission efficiency drops, power received by the portable device will drop, and communication between the portable device and power supply stand can also become difficult making normal power supply impossible.

The present invention was developed with the object of further resolving the drawbacks described above. Thus, it is one object of the present invention to provide a contactless method of supplying power that can stably and reliably detect foreign objects with a simple circuit structure and low manufacturing cost. It is another object of the present invention to provide a contactless method of supplying power that can rapidly detect the presence of a foreign object. Further, it is another object of the present invention to provide a contactless method of supplying power that can determine abnormal shift in the relative position of the receiving coil with respect to the transmitting coil.

SUMMARY OF THE INVENTION

In the contactless method of supplying power of the present invention, a portable device housing a receiving coil is placed on a power supply stand provided with a transmitting coil, the portable device receiving coil is magnetically coupled with the power supply stand transmitting coil, and power is transmitted from the transmitting coil to the receiving coil by magnetic induction. The portable device sends power adjustment signals to the power supply stand requesting increase or decrease in power. The power supply stand regulates transmitting coil output power based on the power adjustment signals to supply the power requested by the portable device. Further, the portable device periodically compares the power received from the power supply stand to the power required (with a given period). When the received power is lower than the required power, the portable device sends a power adjustment signal to the power supply stand, which is an increase-power-request signal. When the received power is greater than the required power, the portable device sends a power adjustment signal to the power supply stand, which is a decrease-power-request signal. Power adjustment signals include increase-power-request weighting values that increase corresponding to the size of the request to increase power supply stand output and/or rate-of-change weighting values that increase corresponding to the amount of change in the requested power. Weighting values, which are output with a given period, are added. If the sum of the weighting values reaches a set value, the presence of a foreign object is concluded.

The contactless method of supplying power described above has the characteristic that foreign objects can be stably and reliably detected with a simple circuit structure and low manufacturing cost. This is because increase-power-request signals, which cause power supply stand output to increase, are provided with weighting values that increase corresponding to the size of the requested power and/or the amount of change in the requested power, the weighting values are added, and a foreign object is judged to be on the power supply stand if the sum of the weighting values reaches a set value. In particular, since the weighting values increase with increased requested power and/or increased change in requested power and foreign object presence is judged when the sum of the weighting values becomes greater than a set value; this method has the characteristic that foreign object presence can be rapidly detected. This is because if a foreign object is on the power supply stand and reducing received power, increase-power-request weighting values and/or rate-of-change weighting values will increase to increase power supply stand output.

The contactless method of supplying power described above has the characteristic that it can determine abnormal conditions such as shift in the relative position of the receiving coil with respect to the transmitting coil. This is because if the relative position of the receiving coil shifts with respect to the transmitting coil and power transmission efficiency drops, the received power will decrease, increase-power-request signals and/or their rate-of-change will increase, and the weighting values will increase. Further, the received power decreases, the increase-power-request signal and/or its rate-of-change increases, and the weighting value increases even in the case of reduced power supply stand output due to transmitting coil or power supply circuit malfunction. Therefore, this method also has the characteristic that it can determine those types of malfunctions as well.

In particular, increase-power-request signals are provided with increase-power-request weighting values that increase with increase in requested power and rate-of-change weighting values that increase with increase in the change in requested power, and by adding both the increase-power-request weighting values and the rate-of-change weighting values, foreign objects can be detected even more rapidly. Accordingly, the method described above has the characteristic that the presence of foreign objects, receiving coil position shift, and malfunctions such as failure in a part of the circuitry can be detected even more rapidly.

However, increase-power-request signals can also be provided with only increase-power-request weighting values that increase with increased requested power, or only rate-of-change weighting values that increase with increased change in the requested power. Further, the method described above can also determine the presence of foreign objects and other malfunctions by adding only the increase-power-request weighting values or only the rate-of-change weighting values.

In the contactless method of supplying power described above, since increase-power-request weighting values output by the portable device are added to determine the presence of foreign objects or relative position shift between coils, there is no need to provide detection components such as temperature sensors on the power supply stand. Accordingly, this method has the characteristic that foreign objects and other abnormal conditions can be detected with a simple circuit structure.

In the contactless method of supplying power described above, foreign object presence is not determined by detecting foreign object heat generation with temperature sensors as in prior art, but rather foreign object presence reduces power transmission efficiency and power adjustment signal weighting values output by the portable device are added to detect foreign object presence as well as coil position shift. Therefore, foreign objects do not become heated to abnormally high temperatures, and this method has the characteristic that foreign objects on the power supply stand can be detected safely.

In the contactless method of supplying power of the present invention, the weighting values can increase proportional to the value of the requested power over a given range. This contactless method of supplying power has the characteristic that foreign object presence and other abnormal conditions can be detected more stably and accurately.

In the contactless method of supplying power of the present invention, the weighting values can increase proportional to the amount of change in the requested power over a given range. This contactless method of supplying power has the characteristic that foreign object presence and other abnormal conditions can be detected stably and accurately.

In the contactless method of supplying power of the present invention, power supply stand output can be limited to a set value. This contactless method of supplying power can more reliably determine foreign object presence and abnormal conditions while effectively preventing excessive heating of foreign objects. This is because power supply stand output is limited to a set value, and increase-power-request signal weighting values output by the portable device will increase when the received power is lower than the requested power.

In the contactless method of supplying power of the present invention, weighting values can be added to detect foreign objects when a preset time has passed after the start of power transmission from the power supply stand to the portable device. Since this contactless method of supplying power detects foreign objects after a set time period has elapsed and received power has stabilized, it has the characteristic that increase-power-request signal weighting values can increase to rapidly detect foreign objects.

In the contactless method of supplying power of the present invention, weighting values can be added to detect foreign objects after the received power has stabilized within a given range. Since this contactless method of supplying power adds weighting values to detect foreign objects when portable device received power is in a stabilized condition, which is when the power supply stand output becomes constant, it has the characteristic that foreign objects can be detected more accurately and more rapidly. In particular, by detecting foreign objects with the power supply stand output limited to set value, this method has the characteristic that it can more accurately detect foreign objects. This is because when a foreign object is on the power supply stand and power transmission efficiency is reduced with power supply stand output power limited at a threshold value, increase-power-request signal weighting values will increase and the sum of the weighting values will rapidly increase. Further, when power supply stand output is not limited, received power will not meet requested power when power supply stand output is at its maximum value. In this situation as well, increase-power-request signal weighting values will increase and foreign objects can be rapidly detected by adding the weighting values. Accordingly, the contactless method of supplying power of the present invention can also detect foreign objects when power supply stand output is not limited to a preset value.

In the contactless method of supplying power of the present invention, the sum of the weighting values can be reset or decreased by a portable device decrease-power-request signal. This contactless method of supplying power has the characteristic that foreign object presence can be reliably determined while preventing erroneous foreign object judgment. This is because a decrease-power-request signal output from the portable device implies that power transmission efficiency is high, and that condition allows judgment that no foreign objects are present. Therefore, by resetting or decreasing the sum of the weighting values, that sum can be quickly reduced to prevent the weighting value summation from reaching the set value.

In the contactless method of supplying power of the present invention, the power supply stand can be a charging pad, the portable device can be a battery powered device, and a battery housed in the battery powered device can be charged by power supplied from the charging pad to the battery powered device. This contactless method of supplying power has the characteristic that the battery powered device can be placed on the charging pad, power can be transmitted from the charging pad to the battery powered device, and the battery in the battery powered device can be charged while making judgments to determine foreign object presence or other abnormal conditions.

In the contactless method of supplying power of the present invention, the battery powered device can charge the internal battery by constant voltage-constant current charging. This contactless method of supplying power can stably charge batteries such as lithium ion batteries or lithium polymer batteries with constant voltage-constant current characteristics.

In the contactless method of supplying power of the present invention, the power supply stand can be configured with a moving mechanism to move the transmitting coil into close proximity with the receiving coil. This contactless method of supplying power has the characteristic that the portable device can be placed without restraint in any location on the power supply stand, the transmitting coil can be put in close proximity with the receiving coil, and after starting power transmission with the transmitting coil and receiving coil in close proximity, foreign objects can be stably and reliably detected.

In the contactless method of supplying power of the present invention, the output voltage of the receiving coil in the portable device can be stepped-down to supply the load. In this contactless method of supplying power, since power received by the receiving coil of the portable device is stepped-down to supply the load, it is possible to receive power transmitted from the transmitting coil with a high voltage at the receiving coil. Consequently, receiving coil output voltage can be high and current flow in the receiving coil can be low. Accordingly, wire runs to the receiving coil do not need to be wide, receiving coil windings do not need to be formed from large diameter wire, the receiving coil can be housed compactly in the portable device, and high energy density effects can be minimized. Further, by reducing current flow in the receiving coil, wasted power consumption can be reduced during power transmission. Specifically, power consumption due to receiving coil resistance can be reduced to enable efficient power transmission.

Finally, the contactless method of supplying power of the present invention can detect foreign objects by adding increase-power-request signal weighting values in the portable device. Further, the contactless method of supplying power of the present invention can also detect foreign objects by adding increase-power-request signal weighting values in the power supply stand. The above and further objects of the present invention as well as the features thereof will become more apparent from the following detailed description to be made in conjunction with the accompanying drawings.

DETAILED DESCRIPTION OF THE EMBODIMENTS

The following describes embodiments of the present invention based on the figures.

Figure 1:
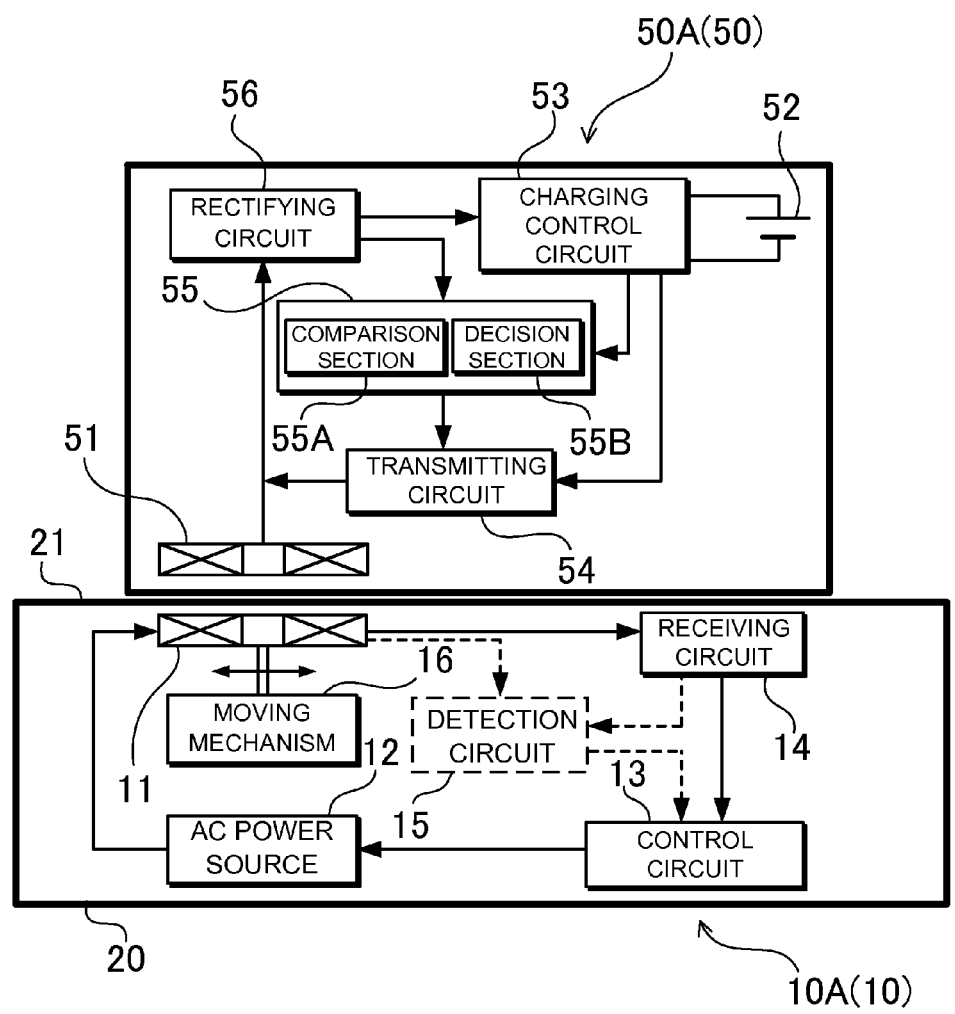
FIG. 1 is a block diagram of a power transmitting power supply stand and portable device for one embodiment of the contactless method of supplying power of the present invention.

FIG. 1 is a block diagram showing a power supply stand that transmits power and portable device for the contactless method of supplying power of the present invention. This figure shows a portable device 50 placed on a power supply stand 10 to supply power from the power supply stand 10 to the portable device 50. In the embodiment described below, the power supply stand 10 is a charging pad 10A, the portable device 50 is a battery powered device 50A, and power is supplied from the charging pad 10A to the battery powered device 50A to charge a battery 52 housed in the battery powered device 50A.

However, the present invention does not limit the power supply stand to a charging pad and the portable device to a battery powered device. Power can also be supplied from the power supply stand to a portable device that is an illumination device or a charging adapter. A portable device that is an illumination device lights an illumination source with power supplied from the power supply stand. A portable device that is a charging adapter uses power supplied from the power supply stand to supply charging power to charge a battery housed in a battery powered device that connects to the charging adapter. Further, the portable device can be a battery pack as well.

The power supply stand 10 has a case 20 provided with an upper plate 21 on its top surface where a portable device 50 is positioned, and a transmitting coil 11 is disposed on the inside of the upper plate 21. The transmitting coil 11 is connected to an AC power source 12 and the AC power source 12 is controlled by a control circuit 13.

The control circuit 13 controls the AC power source 12 to regulate power supplied to the transmitting coil 11 according to power adjustment signals sent from the portable device 50. The control circuit 13 supplies the power requested by the portable device 50 by increasing power output from the AC power source 12 to the transmitting coil 11 for increase-power-request signals input from a receiving circuit 14 and by decreasing AC power source 12 output for decrease-powerrequest signals. The control circuit 13 regulates AC power source 12 output to a value at or below the maximum power output, or at or below a preset power output. Although the control circuit 13 increases AC power source 12 output for an increase-power-request signal, if AC power source 12 output is at the maximum power output or at the set power output, its output is not increased even when an increase-power-request signal is detected.

The power supply stand 10 magnetically couples the transmitting coil 11 and the receiving coil 51 and transmits (supplies) power from the transmitting coil 11 to the receiving coil 51. The portable device 50 is placed without restraint in any location on the upper plate 21, and a moving mechanism 16, which moves the transmitting coil 11 into close proximity with the receiving coil 51, is housed in the power supply stand 10 that charges the battery 52. In this power supply stand 10, the transmitting coil 11 is disposed under the upper plate 21 of the case 20 and is moved along the bottom of the upper plate 21 to a position in close proximity to the receiving coil 51.

The power supply stand 10 and portable device 50 can be configured to allow the portable device 50 to be set in a fixed position in an alignment section of the power supply stand 10. The portable device 50 is set in a fixed location on the power supply stand 10 to put the receiving coil 51 in close proximity to the transmitting coil 11 in the alignment section structure. With the receiving coil 51 in close proximity to the transmitting coil 11, power is transmitted by magnetic induction from the transmitting coil 11 to the receiving coil 51.

Figure 2:
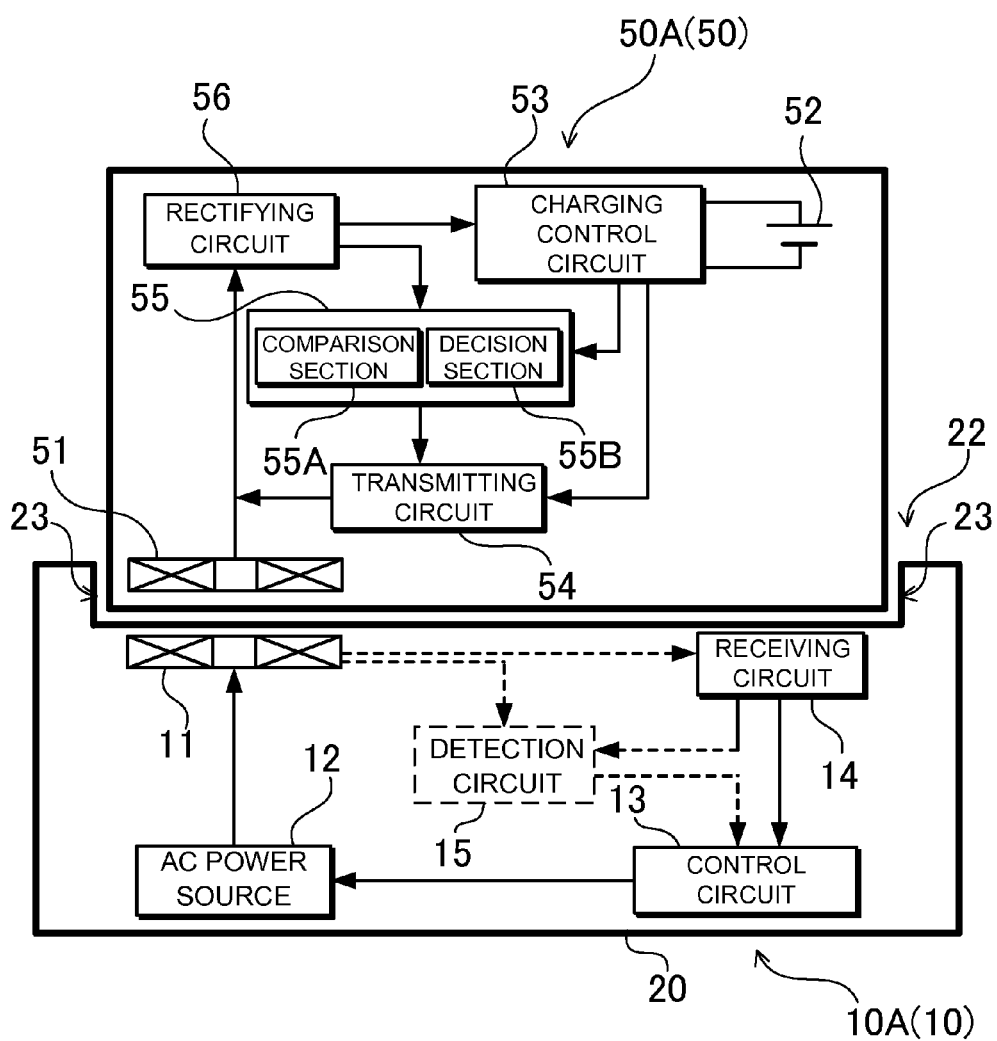
FIG. 2 is a cross-section schematic showing a portable device placed in a set location on a power supply stand configured with an alignment section.

The alignment section structure 22 in FIG. 2 is a fit-together configuration for setting the portable device 50 in a fixed position on the power supply stand 10. In the fit-together configuration of FIG. 2, the portable device 50 fits in a cavity 23 established in the upper surface of the power supply stand 10 to hold the portable device 50 in a fixed position. An alignment section structure could also hold the portable device in a fixed position on the power supply stand by establishing interlocking protrusions and depressions on the mating surfaces of the power supply stand and portable device. A fit-together or interlocking structure can prevent portable device position shift. However, a power supply stand of this configuration is also subject to foreign objects between the power supply stand and the portable device, and foreign objects can be placed in the vicinity of the portable device during power transmission as well. Therefore, error detection to detect foreign objects and other abnormalities is required.

The transmitting coil 11 is a planar (flat) coil wound in a spiral shape in a plane parallel to the upper plate 21 that radiates AC magnetic flux above the upper plate 21. This transmitting coil 11 emits AC magnetic flux perpendicular to, and beyond (above) the upper plate 21. The transmitting coil 11 is supplied with AC power from the AC power source 12 and radiates AC magnetic flux above the upper plate 21. Transmitting coil 11 wire can be wound around magnetic core material (not illustrated) to increase coil inductance. A transmitting coil with a core can focus magnetic flux in a specific region to efficiently transmit power to the receiving coil. However, a magnetic material core is not necessarily required for the transmitting coil, and a coil with no core can also be used. Since a coil with no core is light, the moving mechanism can be simplified for a configuration that moves the transmitting coil inside the top plate. The transmitting coil 11 is made with essentially the same outside diameter as the receiving coil 51 to efficiently transmit power to the receiving coil 51.

Power delivered to the transmitting coil 11 from the AC power source 12 is regulated by the control circuit 13 to supply high frequency power, for example 20 kHz to 1 MHz power, to the transmitting coil 11. In a power supply stand 10 that moves the transmitting coil 11 into close proximity with the receiving coil 51, the AC power source 12 is connected to the transmitting coil 11 via flexible leads. The AC power source 12 is provided with an oscillator circuit, and a power amplifier to amplify the AC power output from the oscillator circuit.

With the transmitting coil 11 in close proximity with the receiving coil 51, the power supply stand 10 supplies AC power from the AC power source 12 to the transmitting coil 11. Transmitting coil 11 AC power is transmitted to the receiving coil 51 to charge the battery 52. When the battery 52 becomes fully-charged, or if a foreign object is detected, or if an abnormal condition is determined, a signal is sent from the portable device 50, and the power supply stand 10 stops supplying power to the transmitting coil 11 to stop battery 52 charging.

The portable device 50 in FIGS. 1 and 2 is a battery powered device 50A, and that portable device 50 houses a receiving coil 51 that magnetically couples with the power supply stand 10 transmitting coil 11. The battery 52 is charged with power induced in the receiving coil 51. Accordingly, the portable device 50 in FIG. 1 is provided with a battery 52; a receiving coil 51; a rectifying circuit 56 that converts AC induced in the receiving coil 51 to direct current (DC); a charging control circuit 53 that regulates the current and voltage of DC output from the rectifying circuit 56 for battery 52 charging; a transmitting circuit 54 that transmits portable device 50 data signals to the power supply stand 10; and a detection circuit 55 that detects received power from rectifying circuit 56 output, compares the received power with the power required to charge the battery 52, determines power adjustment signals, and detects foreign objects from the power adjustment signals.

The battery 52 is a lithium ion battery or a lithium polymer battery. However, the battery can be any battery that can be charged such as a nickel hydride battery or a nickel-cadmium battery. The portable device 50 houses one or a plurality of batteries 52. In the case of a plurality of batteries 52, battery cells are connected in series or parallel, or in a series-parallel combination.

The rectifying circuit 56 performs full-wave rectification of AC induced in the receiving coil 51 with a diode-bridge and smoothes ripple current with a smoothing capacitor. Although the rectifying circuit can rectify AC with a diode-bridge, field-effect transistors (FETs) can also be connected in a bridge configuration and switched ON and OFF in phase with the AC to implement a synchronous rectifying circuit. In a synchronous rectifying circuit, FET ON-resistance is low, rectifying circuit heat generation is low, and temperature rise inside the case of the portable device can be limited. Further, a smoothing capacitor is not necessarily required for battery charging with output from a diode-bridge or synchronous rectifying circuit.

The charging control circuit 53 charges a lithium ion or lithium polymer battery with constant voltage-constant current charging, and charges a nickel hydride or nickel cadmium battery with constant current charging. Further, the charging control circuit 53 detects full-charge of the battery 52 and sends a full-charge signal to the power supply stand 10 via the transmitting circuit 54. The power supply stand 10 detects full-charge signals and data signals sent from the portable device 50 transmitting circuit 54 with its receiving circuit 14. The power supply stand 10 detects data signals from the portable device 50 and controls the AC power source 12 via the control circuit 13. When the power supply stand 10 detects a full-charge signal, it stops supplying power to the transmitting coil 11.

The transmitting circuit 54 sends various data signals including battery data from the portable device 50 to the power supply stand 10. For example, the transmitting circuit 54 can send data signals such as power adjustment signals that are increase-power-request signals or decrease-power-request signals to increase or decrease power supply stand 10 output, and battery 52 full-charge signals. The transmitting circuit 54 can also send battery data signals that include information such as battery 52 voltage, charging current, and temperature during charging; battery serial number; allowable charging current that determines the battery charging current; and allowable battery temperature to control battery charging. The transmitting circuit 54 varies (modulates) the receiving coil 51 load impedance to send various data signals to the transmitting coil 11. The transmitting circuit 54 has a modulating circuit connected to the receiving coil 51. The modulating circuit has a switching device connected in series with a capacitive and/or resistive load and transmits various data signals to the power supply stand 10 by switching the switching device ON and OFF.

The power supply stand 10 receiving circuit 14 detects transmitting coil 11 impedance change, voltage change, or current change to detect data signals sent from the transmitting circuit 54. When the load impedance of the receiving coil 51 is varied, parameters such as impedance, voltage, and current in the transmitting coil 11, which is magnetically coupled with the receiving coil 51, also vary. Therefore, the receiving circuit 14 can detect portable device 50 data signals by detecting variation in transmitting coil 11 parameters.

However, the transmitting circuit can also be a transmitter that transmits a modulated carrier wave. The receiving circuit to receive the carrier wave and detect data signals sent from this type of transmitting circuit is a (wireless) receiver. In general, the transmitting circuit and receiving circuit can have any circuit configuration that enables data signals to be transmitted from the portable device and received by the power supply stand.

The detection circuit 55 is provided with a comparison section 55A that compares received power output from the rectifying circuit 56 with required power and outputs power adjustment signals, and a decision section 55B that determines foreign object presence from comparison section 55A increase-power-request signals.

The comparison section 55A determines received power from the product of the rectifying circuit 56 output voltage and current, compares the received power with the required power, and outputs power adjustment signals. The comparison section 55A determines the required power as the power necessary to charge the battery 52. The comparison section 55A determines the power necessary to charge the battery 52, which is the requested power, from battery 52 parameters such as battery type, voltage, and charging current. Since lithium ion and lithium polymer batteries are charged with constant voltage-constant current characteristics, charging current decreases as the battery 52 approaches full-charge. Accordingly, requested power is reduced as the battery 52 approaches full-charge. In FIGS. 1 and 2, the portable device 50 is a battery powered device 50A, and the consumed power is used to charge the battery 52. Although the requested power is the power used to charge the battery 52 in this type of portable device 50, the portable device is not necessarily limited a battery powered device. For a portable device that is not a battery powered device, the requested power is determined from the power consumed by the load or the specified power of the load.

Power adjustment signals are increase-power-request signals that cause the power supply stand 10 to increase output, and decrease-power-request signals that cause output reduction. The comparison section 55A outputs an increase-power-request signal when it detects received power lower than requested power, and outputs a decrease-power-request signal when it detects received power greater than requested power. The comparison section 55A compares received power with required power and issues increase-power-request and decrease-power-request power adjustment signals to enable optimal power to be supplied to the load.

Figure 3:
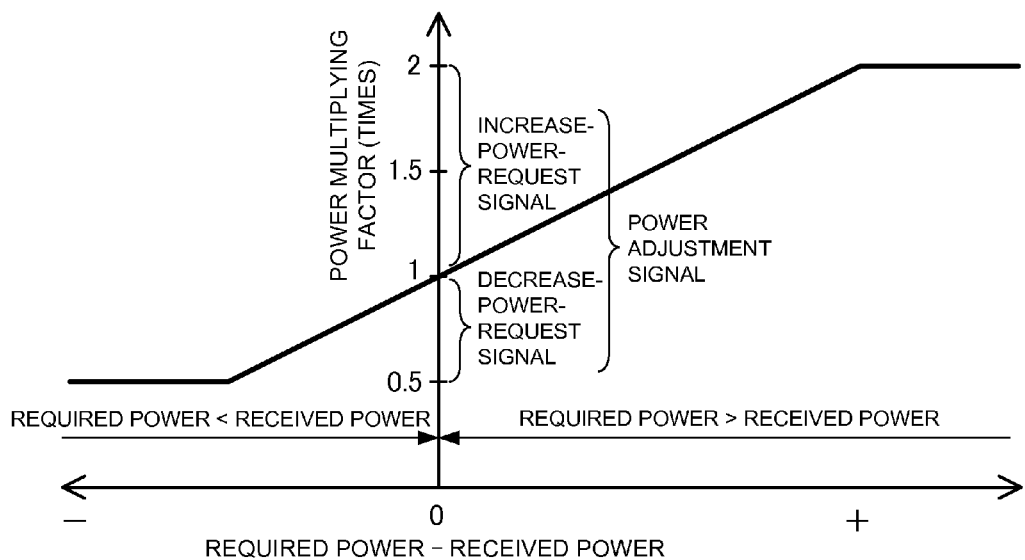
FIG. 3 is a graph showing the power multiplying factor to change the output of the power supply stand according to the power adjustment signal.

The comparison section 55A outputs power adjustment signals that include the size of the difference between the requested power and the received power. Power adjustment signals are transmitted to the power supply stand 10 to increase or decrease and regulate power supply stand 10 output. Turning to FIG. 3, the power multiplying factor that changes power supply stand 10 output according to the power adjustment signal is shown. Power adjustment signals change power supply stand 10 output by a factor of ½ to 2 depending on the size of the difference between the received power and the requested power. When received power is lower than requested power, power supply stand 10 output is increased by a factor of 1 to 2 according to an increase-power-request signal. When received power is greater than requested power, power supply stand 10 output is decreased by a factor of 1 to ½ by a decrease-power-request signal. Although the comparison section 55A for this figure adjusts power supply stand 10 output by a factor of ½ to 2, it is also possible to adjust output with a wider range of multiplying factors.

Figure 4:
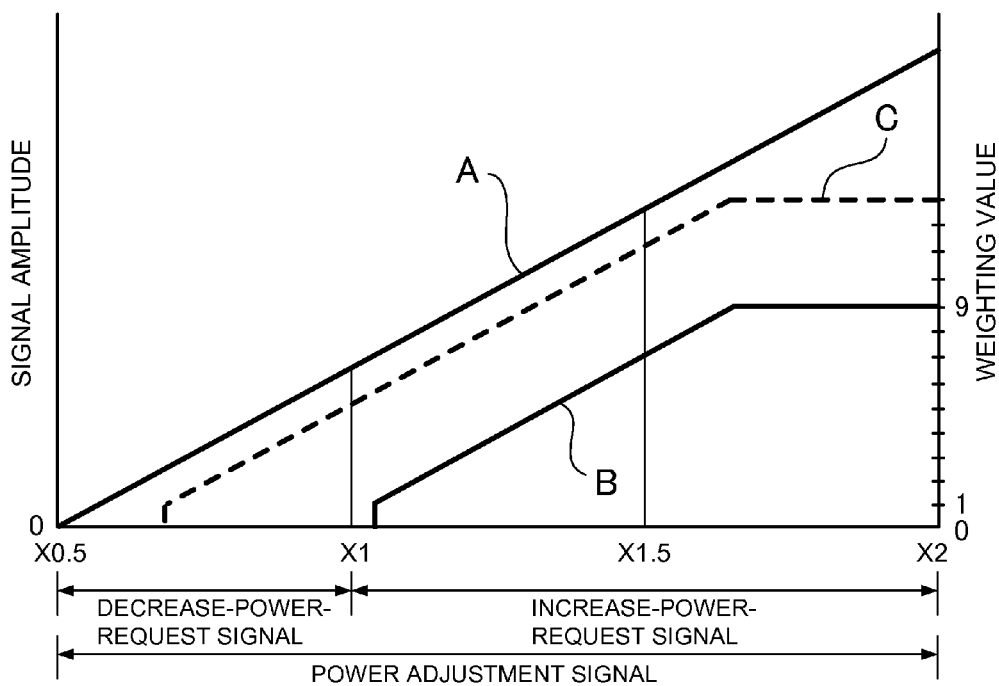
FIG. 4 is a graph showing power adjustment signal amplitude and weighting value as a function of the power multiplying factor.

Line A in FIG. 4 shows power adjustment signal amplitude. Power adjustment signal amplitude varies with the multiplying factor, and signals are interpreted as increase-power-request signals and decrease-power-request signals depending on the amplitude of the power adjustment signal. However, the comparison section can also send increase-power-request signals and decrease-power-request signals to the power supply stand as separate signals. Power adjustment signals in FIG. 4 change in amplitude according to the multiplying factor for increasing and decreasing power supply stand 10 output, which is the power multiplying factor of ½ to 2. Power adjustment signals of different amplitudes are transmitted to the power supply stand 10 via the transmitting circuit 54 and receiving circuit 14. The power supply stand 10 increases and decreases AC power source 12 output according to power adjustment signals received by the receiving circuit 14, and this causes portable device 50 received power to approach the requested power.

In addition, increase-power-request signals output from the comparison section 55A include "increase-power-request weighting values" that increase with the size of the requested increase in power output. Increase-power-request weighting values are shown by line B in FIG. 4. Increase-power-request weighting values shown by line B vary with the multiplying factor that is determined by the difference between received power and requested power. The increase-power-request weighting values of line B increase linearly with the requested multiplying factor over a given range, are zero in the low requested power range, and have a constant value in the range greater than a set value. Increase-power-request weighting values can also be set according to the power adjustment signal multiplying factor as shown by line C in FIG. 4.

Figure 5:
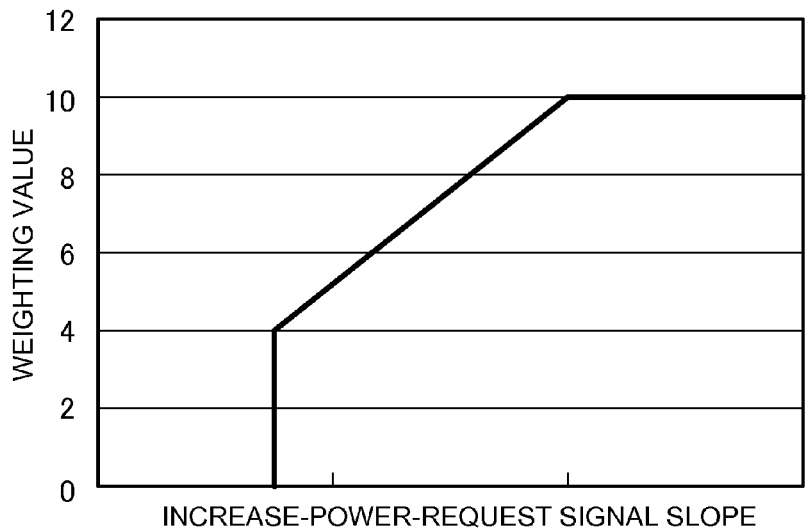
FIG. 5 is a graph showing the weighting value as a function of the change in the increase-power-request signal.

Comparison section 55A increase-power-request signals can also include "rate-of-change weighting values" that increase with the amount of change in power requested by the increase-power-request signals. FIG. 5 shows an example of weighting values as a function of the change in the increase-power-request signal. Rate-of-change weighting values are determined according to the difference between the value of the increase-power-request signal and its previous value, which is the slope of the increase-power-request signal characteristic line. When the amount of change in the increase-power-request signal is large, the rate-of-change weighting value is increased. The rate-of-change weighting values shown in FIG. 5 increase linearly in proportion to the change in increase-power-request signals over a given range, are zero in the low rate-of-change range, and have a constant value in the range greater than a set rate-of-change.

The decision section 55B adds the weighting values output from the comparison section 55A and determines whether or not a foreign object is present. When the sum of the weighting values rises to a previously set value, the decision section 55B judges that a foreign object is present. This is valid because weighting values increase when a foreign object is present.

Figure 6:
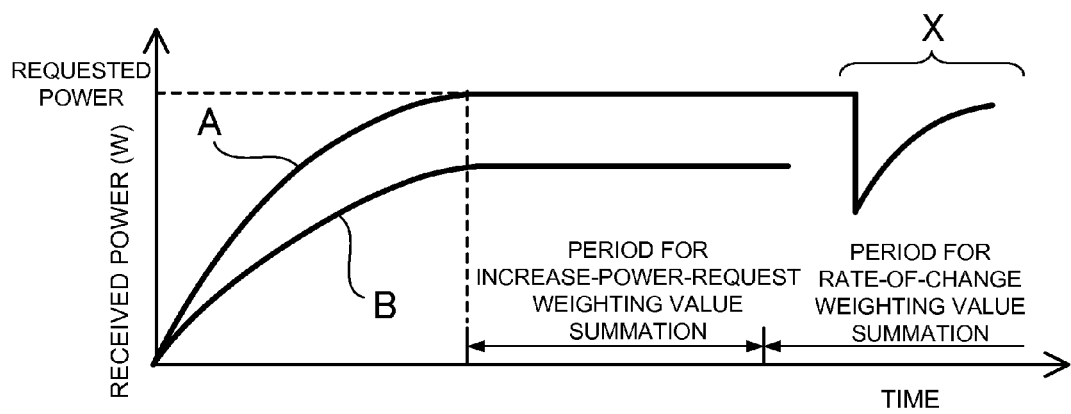
FIG. 6 is a graph showing variation in the power received over time by a portable device placed on the power supply stand.

Turning to FIG. 6, variation in the power received over time by a portable device 50 placed on the power supply stand 10 is shown. The portable device 50 compares received power with required power, and issues increase-power-request signals to increase power supply stand 10 output when received power is below the requested power. The power supply stand 10 receives the increase-power-request signals and successively increases output. Accordingly, portable device 50 received power gradually increases. When no foreign objects are present, transmission efficiency is high, and as shown by curve A in the figure, portable device 50 received power gradually rises to the requested power.

Figure 7:
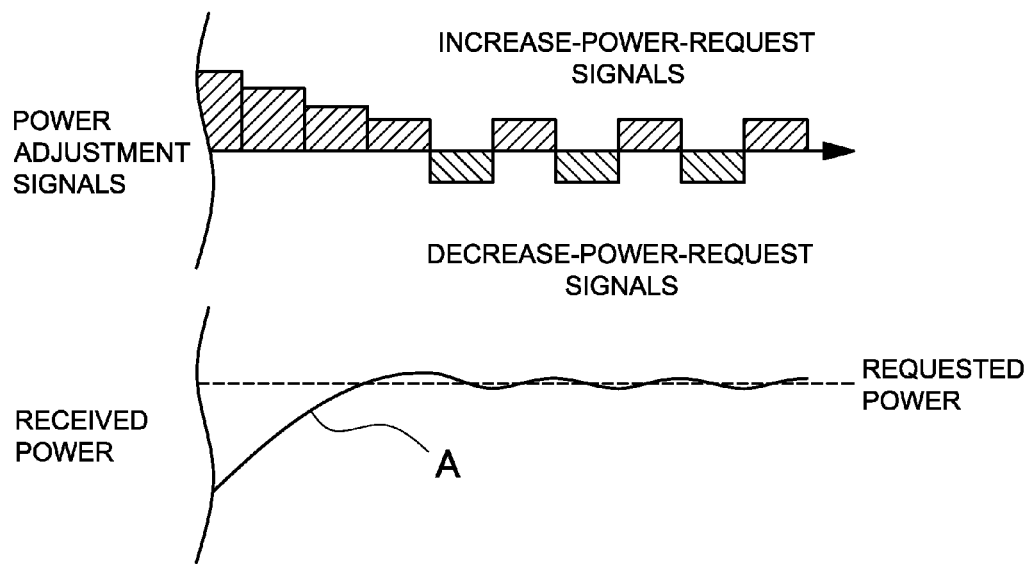
FIG. 7 is a diagram showing variation in power adjustment signals output from the portable device and received power when no foreign objects are on the power supply stand.

FIG. 7 shows increase-power-request signals and decrease-power-request signals issued from the portable device 50 to the power supply stand 10 to make received power (curve A) approach the requested power when the portable device 50 is properly placed on the power supply stand 10. As shown in this figure, the portable device 50 compares received power and required power, issues increase-power-request signals when the received power is less than the required power, and issues decrease-power-request signals when the received power becomes greater than the required power. Specifically, the portable device 50 regulates power supply stand 10 output to ultimately maintain the received power at the required power by alternately issuing increase-power-request signals and decrease-power-request signals. In this situation, the decision section 55B can judge that no foreign objects are present by detecting a decrease-power-request signal, which indicates that the power supply stand 10 to portable device 50 transmission efficiency is high.

As a specific example in the case of a lithium ion battery 52, the charging control circuit 53 charges the battery 52 by constant voltage-constant current charging. The power supply stand 10 control circuit 13 controls the AC power source 12 to regulate transmitting coil 11 output based on power adjustment signals received by the receiving circuit 14. Power adjustment depends on portable device 50 battery 52 data such as voltage and current. For example, when the maximum voltage for charging is 4.2V, charging is performed with a specified constant current at or below a battery voltage of 4.2V. When the transmitting coil 11 output is adjusted and the voltage of the battery 52 becomes 4.2V, the power supply stand 10 control circuit 13 controls the AC power source 12 and adjusts transmitting coil 11 output (with alternating increase and decrease power requests) according to power adjustment signals received by the receiving circuit 14 to maintain a battery voltage of 4.2V.

In contrast, when a foreign object is on the power supply stand 10 along with the portable device 50, the foreign object absorbs transmitting coil 11 power and transmission efficiency is reduced. In this situation, power received by the portable device 50 does not increase to the requested power as shown by curve B in FIG. 6. This is because power supply stand 10 output reaches its maximum value or is limited to a preset power output. Since the received power is lower than the requested power under these conditions, the portable device 50 comparison section 55A continuously issues increase-power-request signals.

Figure 8:
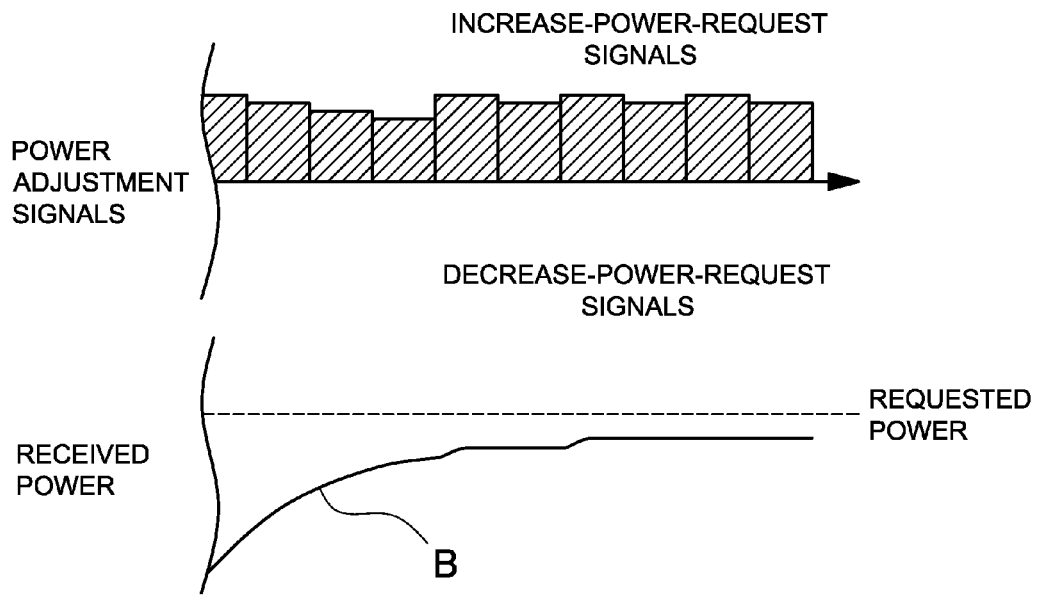
FIG. 8 is a diagram showing variation in power adjustment signals (increase-power-request signals) output from the portable device and received power when a foreign object is on the power supply stand.
Figure 9:
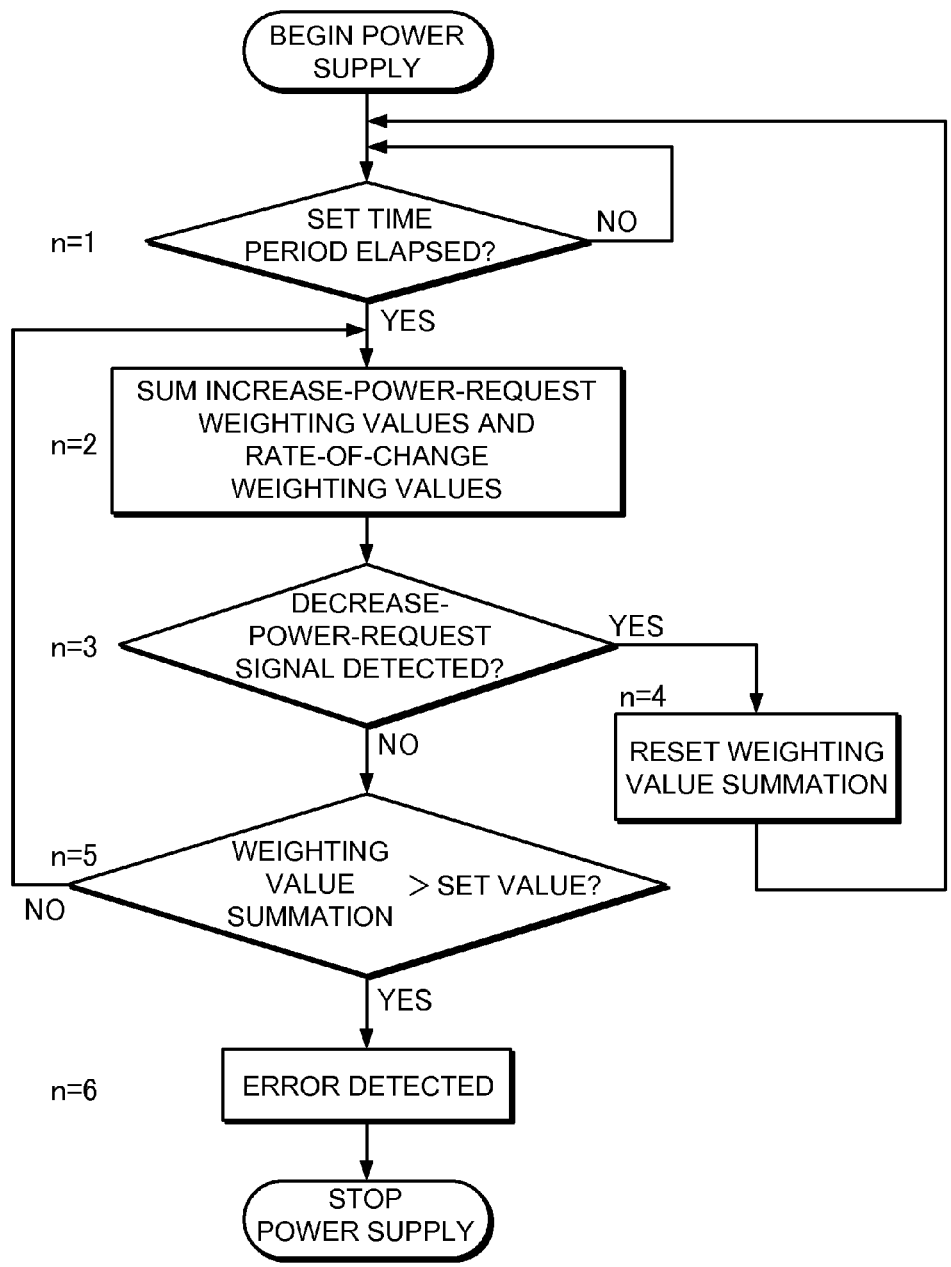
FIG. 9 is a flowchart for error detection by the detection circuit.

FIG. 8 shows increase-power-request signals issued by the portable device 50 when a foreign object is on the power supply stand 10 along with the portable device 50 and some of the transmitting coil 11 power is absorbed by the foreign object. Since the foreign object absorbs some of the transmitting coil 11 power, transmission efficiency is decreased. Consequently, power output by the transmitting coil 11 is not effectively supplied to the receiving coil 51, and the power received by the portable device 50 is decreased. The portable device 50 determines that the received power (shown by curve B) is less than the requested power and issues an increase-power-request signal. Although the power supply stand 10 increases output when it detects the increase-power-request signal, the foreign object absorbs transmitting coil 11 output and the power received by the portable device 50 does not rise to the requested power. As a result, the portable device 50 continuously issues increase-power-request signals to the power supply stand 10. Since the increase-power-request signals include increase-power-request weighting values, the decision section 55B adds those weighting values and that summation increases. When the sum of the weighting values reaches a set value, the decision section 55B concludes that a foreign object is present.

Here, transmission efficiency is the efficiency by which power is transmitted from the power supply stand 10 to the portable device 50. Specifically, transmission efficiency is the ratio of power received by the portable device 50 to the power output by the power supply stand 10, which is equal to the product of battery voltage and charging current in the portable device 50 divided by the product of voltage and current output by the power supply stand 10. When a foreign object is on the power supply stand 10, this transmission efficiency is reduced. This is because power received by the portable device 50 decreases with respect to power output by the power supply stand 10. When received power decreases and transmission efficiency is reduced, the portable device 50 continuously issues increase-power-request signals. Accordingly, when transmission efficiency is reduced and increase-power-request signals are output continuously, increase-power-request signal weighting values are added, their sum reaches the set value, and a foreign object is judged to be present.

In FIG. 6, the decision section 55B begins weighting value summation after the received power has stabilized at a constant value. Since received power stabilizes at a constant value after a given time period from the start of power transmission, the decision section 55B can begin weighting value summation after a set time has elapsed. A decision section 55B that sums weighting values after a set time has elapsed is provided with a timer to time the set time period. A decision section 55B that sums weighting values after the received power has stabilized at a constant value is equipped with a processing section that determines when received power has settled within a constant range.

A decision section 55B that sums weighting values after received power has stabilized at a constant value can detect the presence of foreign objects with greater accuracy. However, the decision section 55B can also detect foreign objects by adding weighting values right from the beginning of power transmission. This type of decision section 55B has a higher set weighting value sum (threshold value) for determining foreign object presence. This is because the sum of the weighting values increases until received power reaches a constant value regardless of whether or not a foreign object is present.

Further, when the portable device 50 is being supplied with power, movement of the portable device 50 that causes shift in receiving coil 51 position relative to the transmitting coil 11, or placement of a foreign object on the power supply stand 10, that causes reduced power transmission efficiency can be detected. The region of FIG. 6 labeled X shows a temporary reduction in received power due to shift in receiving coil 51 position relative to the transmitting coil 11, or due to placement of a foreign object in the vicinity of the portable device 50 causing some of the transmitting coil 11 output to be absorbed by the foreign object and causing power transmission efficiency to be reduced. If transmission efficiency drops during power transmission and the received power drops temporarily, the portable device 50 will send increase-power-request signals to the power supply stand 10, and the power supply stand 10 will gradually increase power output. When the drop in transmission efficiency in region X is small, power supply stand 10 output can be increased to supply the requested power. When the drop in transmission efficiency in region X is large, power supply stand 10 output is increased to its maximum value or is limited to a preset power output and the received power remains below the requested power.

As shown by region X in FIG. 6, a drop in transmission efficiency can occur during power transmission due to shift in receiving coil 51 position relative to the transmitting coil 11. For example, if the portable device 50 is a mobile phone that receives an incoming call while it is being charged on the power supply stand 10, the phone can shift position due to bell ringing or vibration (in a vibrator mode). Or, the mobile phone can be moved by contact with the user or other object. If the portable device 50 shifts position relative to the power supply stand 10 or a foreign object is placed in the vicinity of the portable device 50, it becomes impossible to supply power efficiently. When this situation is detected, the user can be alerted by a notification technique such as lamp (not illustrated) illumination, voice output, or other warning signal. In that case, the user can remove the foreign object or adjust the position of the portable device 50 to restore conditions for normal power transmission. In the case of a power supply stand 10 configured to move the transmitting coil 11 into close proximity with the receiving coil 51; the transmitting coil 11 can be realigned into close proximity with the receiving coil 51 to correct for the position shift.

A detection circuit 55 to rapidly determine abnormalities during power transmission such as those described above includes rate-of-change weighting values in the power adjustment signals output from the comparison section 55A to the decision section 55B. The rate-of-change weighting values increase with the amount of change in the requested power supply stand 10 output and are summed with a given period in the decision section 55B. Rate-of-change weighting values output by the comparison section 55A increase with the difference between the requested power and its previous value, which is the slope of the power requested by the increase-power-request signals. Accordingly, if received power drops during power transmission as shown in region X of FIG. 6, and requested power changes to increase power, the rate-of-change weighting values will increase. This is because the amount of change in the increase-power-request signals will abruptly increase. Consequently, rate-of-change weighting values will increase when received power changes in an event such as that shown in region X of FIG. 6. The decision section 55B adds the weighting values and detects when the sum reaches a set value to determine an abnormal condition. Specifically, an abnormal condition is judged when the weighting value summation rises to the set value.

The detection circuit 55 described above determines weighting values in the comparison section 55A and outputs signals including the weighting values to the decision section 55B. However, the detection circuit 55 could also determine weighting values in the decision section 55B from the amplitude of power adjustment signals output from the comparison section 55A, and the decision section 55B could add the weighting values to detect foreign objects or other abnormalities.

The decision section 55B resets the weighting value summation with a decrease-power-request signal. Or, the decision section 55B performs subtraction from the weighting value summation when a decrease-power-request signal is detected. As described previously, detection of a decrease-power-request signal implies that power transmission efficiency is high and absence of foreign objects can be concluded. Therefore, by resetting or decreasing the weighting value summation with a decrease-power-request signal, foreign object presence can be reliably determined while avoiding erroneous judgments. However, the decision section 55B could also reset or decrease the weighting value summation when decrease-power-request signals and increase-power-request signals are input repeatedly or when received power stabilizes within a constant range. Further, since power received by the portable device 50 stabilizes after a given time period and weighting values are added to determine abnormalities after a set time has elapsed, the weighting value summation could subsequently be reset after another set time has elapsed. Or, when received power stabilizes at a constant value, the decision section 55B could reset the increase-power-request weighting values, and when decrease-power-request signals and increase-power-request signals are alternately and repeatedly input, the rate-of-change weighting values could be reset.

The detection circuit 55 sends a foreign object detection signal to the power supply stand 10 if a foreign object is detected. When the power supply stand 10 detects a foreign object detection signal, the AC power source 12 is controlled by the control circuit 13 to stop the supply of power from the AC power source 12 to the transmitting coil 11. However, the power supply stand 10 could also continue supplying power by a method that adjusts power supplied to the transmitting coil 11 to a preset minimum power or to a setting that allows continued power supply stand 10 output without excessively heating the foreign object. In this type of operation, power transmission from the power supply stand 10 to the portable device 50 is not stopped when a foreign object is detected, but rather, foreign object removal is urged by alerting the user while power supply is continued with output limited to a set value.

The detection circuit 55 detects abnormalities (errors) according to the flowchart shown in FIG. 7 and described below.

[Steps n=1 and n=2]

When the portable device 50 is placed on the power supply stand 10 and the power supply stand 10 begins supplying power, the timer in the decision section 55B begins timing. When the set time period has elapsed, the decision section 55B sums the increase-power-request weighting values and rate-of-change weighting values included in the increase-power-request signals in step n=2.

[Steps n=3 and n=4]

Judgment is made whether or not a decrease-power-request signal has been output. If a decrease-power-request signal has been output, control moves to step n=4 where the weighting value summation is reset and control returned to step n=1. If a decrease-power-request signal has not been output, control sequences to step n=5.

[Steps n=5 and n=6]

The summation of weighting values is compared to the set value. If the summation of weighting values is greater than the set value, presence of a foreign object or other abnormality is judged, namely an error is detected in step n=6 and power transmission is stopped. If the summation of weighting values is below the set value, control jumps to step n=2 to loop through steps n=2 to n=5.

The detection circuit 55 described above detects errors by adding both increase-power-request weighting values and rate-of-change weighting values. This method can detect foreign objects present along with the portable device 50 at the start of power transmission, and it can detect foreign objects subsequently placed on the power supply stand 10 or other error conditions such as position shift in the portable device 50 that develop while power is being supplied. The detection circuit 55 can also detect errors by summing only the increase-power-request weighting values or only the rate-of-change weighting values. A detection circuit 55 that sums only increase-power-request weighting values can detect foreign objects initially placed on the power supply stand 10 along with the portable device 50, and can also detect received power dropping below requested power during power transmission (as shown in FIG. 6) due to a foreign object or error condition such as portable device 50 position shift. A detection circuit 55 that sums only rate-of-change weighting values can detect temporary drop in transmission efficiency during power transmission and detect foreign object presence or portable device 50 position shift error conditions.

As shown in FIG. 6, the detection circuit 55 can also sum increase-power-request weighting values to detect errors after a set time has elapsed from the start of power transmission, and subsequently sum rate-of-change weighting values to detect errors after another set time has elapsed.

In the power supply stand 10 and portable device 50 described above, power adjustment signals are sent from the portable device 50 to the power supply stand 10, power supply stand 10 output is controlled according to the power adjustment signals, and power adjustment signal weighting values are added in the portable device 50 detection circuit 55 to detect foreign objects and other error conditions. However, the power supply stand 10 and portable device 50 can also be configured to send power adjustment signals from the portable device 50 to the power supply stand 10, to detect the power adjustment signals to control power supply stand 10 output and detect foreign objects by adding power adjustment signal weighting values (sent from the portable device 50) at the power supply stand 10. This type of power supply stand 10 and portable device 50 are shown in FIGS. 1 and 2 as indicated by the broken lines. As shown by the broken lines in FIGS. 1 and 2, a detection circuit 15 is provided in the power supply stand 10 to detect foreign objects and other error conditions by adding power adjustment signal weighting values sent from the portable device 50.

Figure 10:
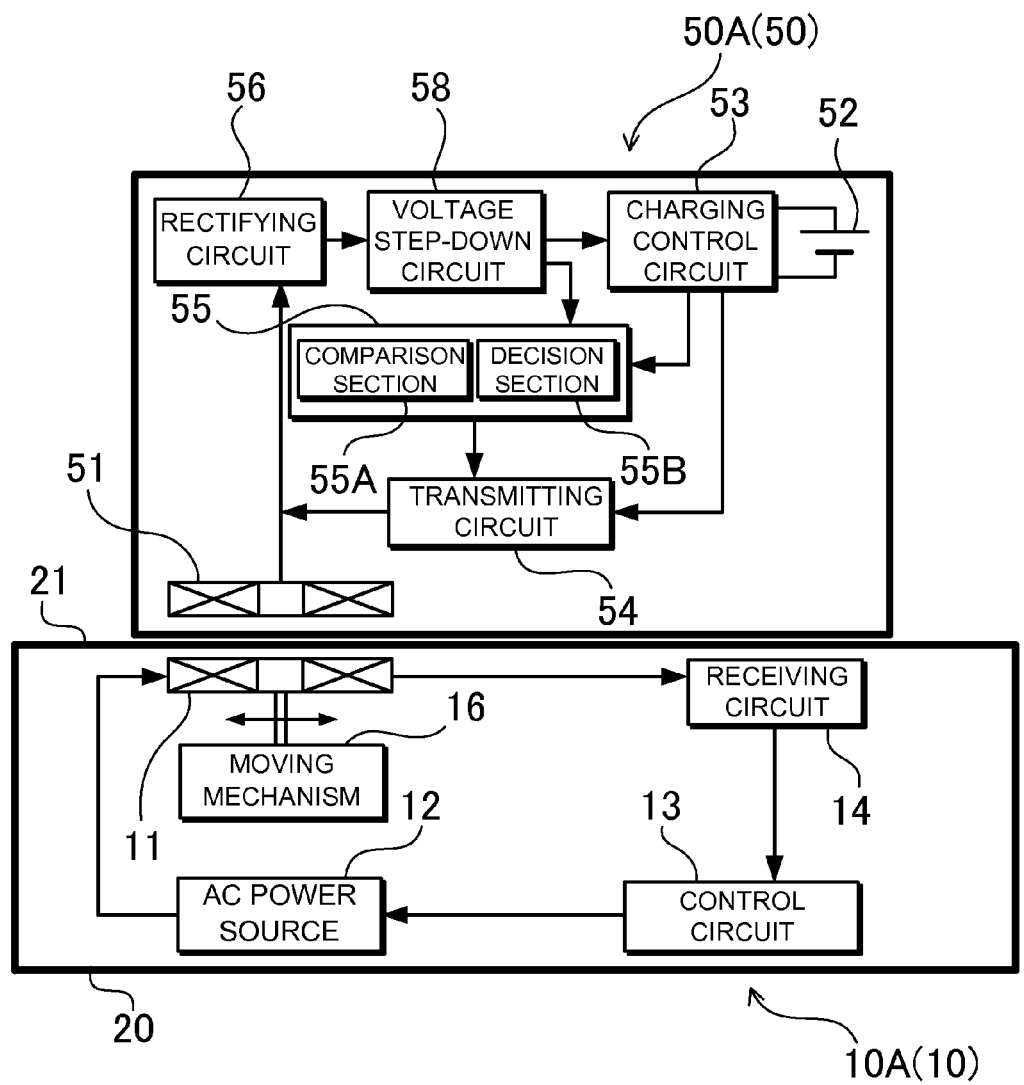
FIG. 10 is a block diagram of a power transmitting power supply stand and portable device for another embodiment of the contactless method of supplying power of the present invention.

Turning to FIG. 10, a portable device 50 is shown that is configured to increase receiving coil 51 output voltage and step-down the voltage of power from the receiving coil 51 to supply the load. The portable device 50 shown in the figure is a battery powered device 50A provided with a receiving coil 51 that receives power transmitted from the power supply stand 10 and converts it to a high voltage, a rectifying circuit 56 that converts AC induced in the receiving coil 51 to DC, a voltage step-down circuit 58 that steps-down the voltage of DC power output from the rectifying circuit 56, and a charging control circuit 53 that regulates the charging current and voltage of DC output from the voltage step-down circuit 58 to charge the battery 52.

To receive power transmitted from the power supply stand 10 with a high voltage, the portable device 50 of the figure has a receiving coil 51 with an increased number of windings. A receiving coil 51 configured with a high winding count can increase the voltage received by the receiving coil 51 without changing the amount of power transmitted from the power supply stand 10 transmitting coil 11. Consequently, voltage received by the receiving coil 51 can be increased while using the original (unmodified) power supply stand 10. For example, by doubling the number of receiving coil windings, the received voltage can be doubled. This is because the electromotive force (EMF) generated by magnetic induction in the receiving coil 51 is proportional to the receiving coil 51 winding count. The number of windings in the receiving coil 51 is set for an optimum output voltage considering the diameter of wire used in the coil and the voltage rating of the rectifying circuit 56 that rectifies receiving coil 51 output. In the portable device 50 of the figure, the rectifying circuit 56 is established at the output-side of the receiving coil 51, and high voltage AC power output from the receiving coil 51 is converted to high voltage DC power output from the rectifying circuit 56.

Further, to supply power that is stepped-down in voltage from the high voltage received by the receiving coil 51, a voltage step-down circuit 58 is provided on the output-side of the rectifying circuit 56. The voltage step-down circuit 58 is a DC/DC converter that reduces the high voltage DC power input from the rectifying circuit 56 to a specified voltage for output to the load. In the portable device 50 shown in the figure, the load that consumes power transmitted from the power supply stand 10 is a battery 52 that can be charged and a charging control circuit 53 that charges the battery 52. Accordingly, the voltage step-down circuit 58 reduces rectifying circuit 56 output voltage to an optimum load voltage, which is the optimum voltage for the charging control circuit 53 that charges the battery 52.

The portable device 50 described above also includes a detection circuit 55, and the detection circuit 55 detects received power from the voltage step-down circuit 58 output. Further, the detection circuit 55 compares the received power with required power, which is the power required to charge the battery 52, determines power adjustment signals, and detects foreign objects from the power adjustment signals. Power adjustment signals are sent from the detection circuit 55 to the power supply stand 10 via a transmitting circuit 54.

The method described above receives power transmitted from the power supply stand 10 at a high voltage by the receiving coil 51, converts receiving coil 51 AC power to DC with the rectifying circuit 56, and steps-down the rectifying circuit 56 output voltage to supply the load. Since voltages applied to the receiving coil 51 and the rectifying circuit 56 are increased, current flow in the receiving coil 51 and rectifying circuit 56 can be reduced. As a result, wire runs for the receiving coil 51 and rectifying circuit 56 do not need to be wide, receiving coil 51 windings do not need to use large diameter wire, and those components can be housed compactly in the portable device 50. Further, in a portable device 50 structure that houses a receiving coil 51, high energy density effects can be limited. In addition, by reducing current flow in the receiving coil 51 and rectifying circuit 56, wasted power during transmission can be reduced. Specifically, power consumed by receiving coil 51 resistance and rectifying circuit 56 components can be reduced and efficient power transmission can be realized.

The contactless method of supplying power of the present invention can be applied most suitably as a method of charging a battery by transmitting power via magnetic induction from a power supply stand that is a charging pad, etc. to a portable device that is a battery powered device, etc. Further, the method is not limited to battery charging applications and can also be used to supply power in a contactless manner to devices such as illumination devices or charging adapters. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2012-100409 filed in Japan on Apr. 25, 2012, the content of which is incorporated herein by reference.

What is claimed is:

1. A contactless method of supplying power comprising:

placing a portable device housing a receiving coil on a power supply stand provided with a transmitting coil and magnetically couple the portable device receiving coil to the power supply stand transmitting coil; and transmitting power from the transmitting coil to the receiving coil by magnetic induction while sending power adjustment signals from the portable device to the power supply stand to enable the power supply stand to adjust transmitting coil output based on the power adjustment signals and supply the power requested by the portable device, wherein the portable device compares the power received from the power supply stand to the power required with a given period; when the received power is lower than the required power, the portable device sends an increase-power-request signal to the power supply stand as the power adjustment signal;

when the received power is greater than the required power, the portable device sends a decrease-power-request signal to the power supply stand as the power adjustment signal, wherein power adjustment signals include increase-power-request weighting values that increase corresponding to the size of the request to increase power supply stand output and/or rate-of-change weighting values that increase corresponding to the amount of change in the requested power; the weighting values, which are output with the given period, are added; and If the sum of the weighting values attains a set value, a foreign object is determined to be present.

2. The contactless method of supplying power as cited in claim 1 wherein the weighting values increase proportional to the value of the requested power within a given range.

3. The contactless method of supplying power as cited in claim 1 wherein the weighting values increase proportional to the amount of change in requested power within a given range.

4. The contactless method of supplying power as cited in claim 1 wherein the power supply stand output is limited to the set value.

5. The contactless method of supplying power as cited in claim 1 wherein the weighting values are added to detect foreign objects when a preset time has elapsed after the start of power transmission from the power supply stand to the portable device.

6. The contactless method of supplying power as cited in claim 1 wherein the weighting values are added to detect foreign objects after the received power has stabilized within a given range.

7. The contactless method of supplying power as cited in claim 1 wherein the sum of the weighting values is reset or decreased by a portable device decrease-power-request signal.

8. The contactless method of supplying power as cited in claim 1 wherein the power supply stand is a charging pad, the portable device is a battery powered device, and a battery housed in the battery powered device is charged by power supplied from the charging pad to the battery powered device.

9. The contactless method of supplying power as cited in claim 8 wherein the battery powered device charges the internal battery by constant voltage-constant current charging.

10. The contactless method of supplying power as cited in claim 1 wherein the power supply stand has a moving mechanism that moves the transmitting coil into close proximity with the receiving coil.

11. The contactless method of supplying power as cited in claim 1 wherein the output voltage of the receiving coil in the portable device is stepped-down to supply the load.

12. The contactless method of supplying power as cited in claim 1 wherein the portable device sums increase-power-request signal weighting values to detect foreign objects.

13. The contactless method of supplying power as cited in claim 1 wherein the power supply stand sums increase-power-request signal weighting values to detect foreign objects.

* * * * *